3,153,802
WINDSHIELD WIPER SYSTEM
Sheldon J. Howard, Buffalo, N.Y., assignor to Trico Products Corporation, Buffalo, N.Y.
Filed Dec. 22, 1959, Ser. No. 861,329
5 Claims. (Cl. 15—250.27)

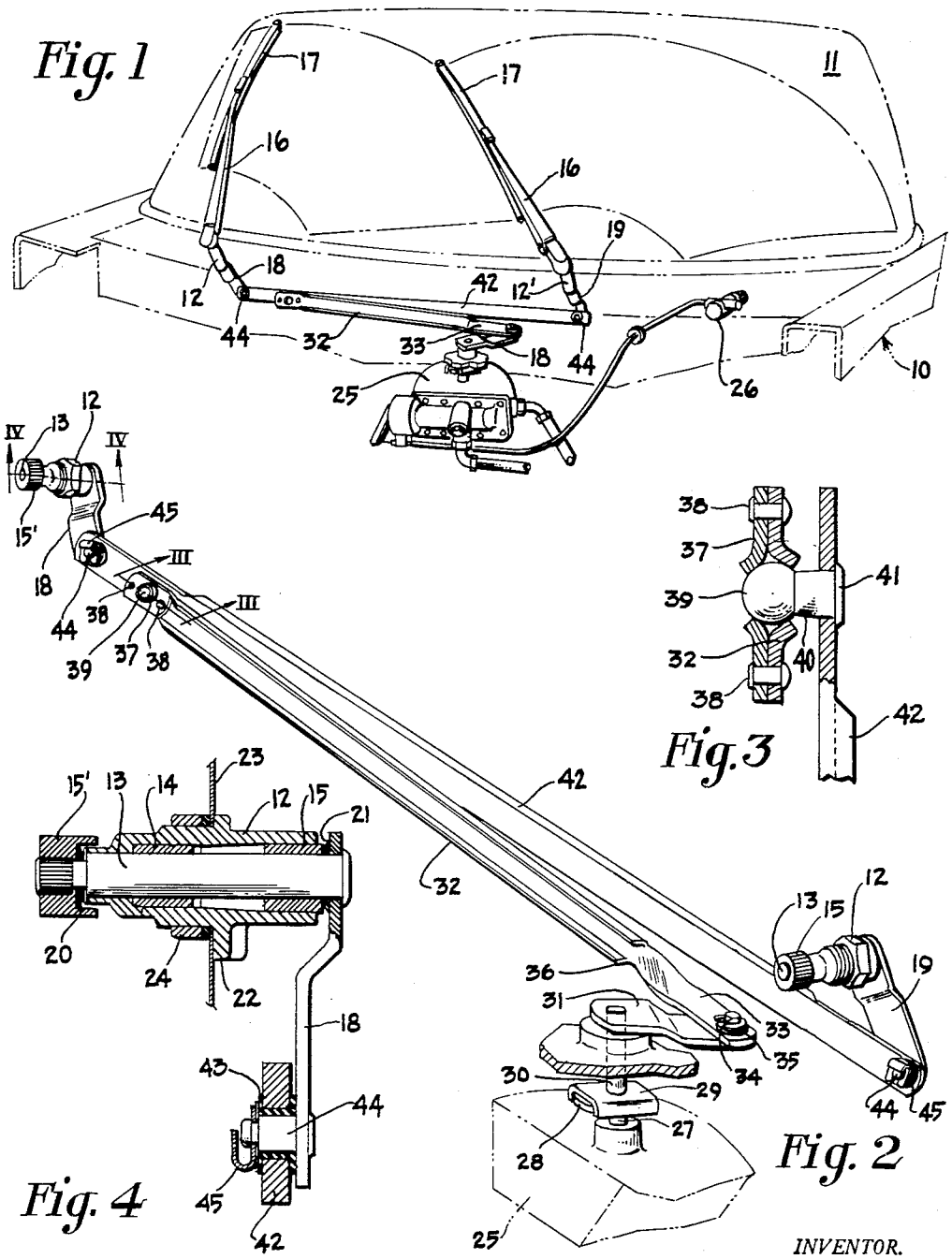

The present invention relates to a windshield wiper system and more particularly to one containing an improved drive linkage.

It is an object of the present invention to provide a rigid link type of drive linkage for a "parallel wipe" type of windshield wiper system wherein the link connections receive relatively little wear in operation; wherein the system can be fabricated at a relatively low cost; and wherein the linkage is capable of utilizing an extremely small space to perform its wiper driving function. Other objects and attendant advantages of the present invention will readily be perceived hereafter.

The linkage of the present invention is intended to be used in a "parallel wipe" type of wiper system, wherein the wipers remain substantially parallel in all positions of their strokes. In the installation in which the present invention is used, one rockshaft, which mounts a wiper arm, is positioned much closer to the center of a windshield than is the other. The rockshafts are each driven by a crankarm. The crankarm which is coupled to the rockshaft positioned relatively close to the center of the windshield is shorter than the crankarm coupled to the more remotely positioned rockshaft. Since both rockshafts are driven from the same source of power, it will readily be seen that the wiper blade associated with the lockshaft having a shorter crankarm will be driven through a greater angular distance than the wiper blade associated with the rockshaft having a longer crankarm. The pattern provided by the wiper blade traveling the greater distance extends over the pattern provided by the wiper blade traveling the shorter distance. This overlapping of patterns causes substantially the entire frontal area of the windshield to be wiped. The rockshafts are coupled to each other by a first elongated link. Thus, only one driving connection is required between the motor output and the elongated link to drive both wipers. In accordance with the present invention, an elongated second link is coupled between a motor driven crankarm and the first elongated link. Because the second link is relatively long, there is a minimum amount of angular movement between it and the first link, and this very small angular movement between the links results in substantially no friction or wear at the point of connection between the two elongated links. Furthermore, because the major thrust from the motor for the operation of both wipers is transmitted directly to the first link, the running, oscillating movement of each rockshaft is experienced only in the pivot pins at each end of the first link to further reduce the friction and wear. Furthermore, while the two elongated links reciprocate in substantially vertical planes, the wiper motor is positioned with its driveshaft extending in a vertical direction, this positioning being for the purpose of conserving space. The present invention will be more fully understood when the following portions of the specification are read in conjunction with the accompanying drawings wherein:

FIG. 1 is a fragmentary perspective view of an automotive vehicle mounting the improved linkage of the present invention;

FIG. 2 is an enlarged perspective view showing the linkage of the present invention;

FIG. 3 is a view partly in cross-section taken along the line of III—III of FIG. 2; and FIG. 4 is a view partly in cross-section taken along line IV—IV of FIG. 2.

In FIG. 1 an automotive vehicle 10 is shown having a windshield 11 mounted thereon in the usual manner. Suitably journaled in the cowl of the vehicle are sleeves 12 and 12′ in which rockshafts 13 are journaled for rotation in bearings 14 and 15 (FIG. 4). Sleeves 12 and 12′ are identical in construction and the ensuing description will treat only one of these sleeves for the sake of convenience. Suitably retained on the knurled drive burrs 15′ formed at the ends of rockshafts 13 are wiper arms 16 which mount wiper blades 17. On the other end of rockshaft 13 of sleeve 12, a crankarm 18 is rigidly affixed; on the other end of rockshaft 13 in sleeve 12′, crankarm 19 is rigidly affixed. Spring washer 20 is mounted between sleeve 12 and burr 15′ and spring washer 21 is mounted between bearing 15 and crankarm 18. A similar arrangement is provided relative to sleeve 12′. These spring washers serve to take up the axial looseness between shafts 13 and the sleeves 12 and 12′. Sleeve 12 has a collar 22 (FIG. 4) which is adapted to abut against the rear side of cowl plate 23. A nut 24 threadably mounts on sleeve 12 to retain the latter in assembled condition on the cowl plate 23.

A wiper motor 25 is provided for oscillating wiper 17 back and forth in the usual manner. As is well understood in the art, a motor control 26 is mounted on the vehicle dashboard for the purpose of turning the wiper motor on and off. As can be seen from FIGS. 1 and 2, motor 25 is positioned with its shaft 27 extending in a substantially vertical direction. This orientation of the motor is for the purpose of permitting it to lie in a limited space. Motor shaft 27 terminates at rectangular drive member 28 which in turn is engaged by drive member 29 mounted on one end of drive shaft 30 which mounts crankarm 31 at the other end thereof. When wiper motor 25 is placed in operation, crankarm 31 will thus be caused to oscillate. The oscillation of crankarm 31 is transmitted to crankarms 18 and 19 in the following manner. A link 32 which is of channel-shaped cross-sectional configuration throughout the major portion thereof has an end portion 33 pivotally mounted on pin 34. Portion 33 has a rubber grommet 35 mounted therein for shock absorbing purposes as well as for permitting slight changes in orientation between link 32 and crankarm 31. It is to be noted that the end portion 33 of link 32 is twisted at 36 so that it lies in a substantially horizontal plane whereas the remainder of link 32 lies in a substantially vertical plane. The purpose of the twist in this linkage is to enable motion to be transmitted conveniently from wiper motor 25 which has its shaft extended in a vertical direction. The other end of link 32 has a plate 37 held thereon by rivets 38. Plate 37 and the main link body portion 32 are formed to receive ball 39 which is formed at the end of shaft 40 which is in turn held as by a force fit and pinion 41 in elongated link 42, which is also of channel-shaped configuration throughout the major portion of its length. Link 42 extends between crankarm 18 and crankarm 19. Each end of link 42 has a rubber grommet 43 (FIG. 4) mounted therein for receiving shafts 44 which extend from crankarms 18 and 19. Spring clips 45 maintain link 42 and crankarms 18 and 19 in assembled relationship. It can thus be seen that as crankarm 31 is caused to oscillate back and forth, crankarms 18 and 19 will be caused to oscillate accordingly because of the intermediate linkage consisting of links 32 and 42.

Because link 32 is more than one-half the length of link 42, there is relatively little pivotal movement therebetween about ball 39. The minimizing of relative movement because of the lengths of the links results in a minimum of wear at the point of pivotal connection therebetween. It will further be noted that sleeve 12′ is located much closer to the center of the windshield than is sleeve 12. This positioning, coupled with the fact that crankarm 19 is shorter than crankarm 18, causes wiper blade 17 driven from the rockshaft associated with sleeve 12′ to produce a larger wiped pattern than the other wiper blade. Since a parallel wipe is utilized and since the wiper blades have overlapping wipe patterns substantially the entire frontal area of the windshield can be maintained clear during precipitation.

In view of the fact that links 32 and 42 approach the same long length and extend in substantially the same direction, there is a minimum of up and down movement of link 32 which accompanies its horizontal reciprocation; that is, the end portion of link 32 proximate motor 25 does not have much up-and-down movement and thus there need not be a large clearance between this portion of the link and other parts of the vehicle in this general location. Furthermore, since this end portion of link 32 does not experience much up-and-down motion, an inexpensive connection including pin 34 may be utilized between link 32 and crankarm 31.

While a preferred embodiment of the present invention has been described, it is to be understood that it is not to be limited thereto, but may be otherwise embodied within the scope of the following claims.

What is claimed is:

1. A windshield wiper system comprising first and second wiper blades mounted at opposite sides of the center of a windshield, first and second wiper arms for mounting said first and second wiper blades, respectively, first and second rockshafts for mounting said first and second wiper arms, respectively, first and second crankarms coupled to said first and second rockshafts, respectively, a first elongated link, first pivot means coupling one end of said first elongated link to said first crankarm, second pivot means coupling the other end of said first elongated link to said second crankarm, a wiper motor positioned between said first crankarm and said second crankarm, a third crankarm extending from said wiper motor, and a second elongated link extending in generally the same direction as said first elongated link, third pivot means on said first elongated link having its pivotal center on a line connecting said first and second pivot means coupling one end of said second elongated link to said first elongated link proximate said second pivotal connection but spaced therefrom along the length of said first link, fourth pivot means coupling the other end of said second elongated link to said third crankarm extending from said wiper motor whereby the motion of said wiper motor is transmitted to said first link through said second link with less relative rotation between said first and second elongated links at said third pivot means than exists between said first elongated link and said crankarms at said first and second pivot means.

2. A system as set forth in claim 1 wherein said second elongated link is at least half the length of said first elongated link to thereby result in a relatively small amount of relative movement therebetween when said wiper motor is in operation.

3. A system as set forth in claim 1 wherein said first crankarm is shorter than said second crankarm to thereby cause said first wiper blade to travel a greater angular distance than said second wiper blade during each stroke of said wiper blades and wherein said first rockshaft is mounted closer to the center of a windshield than is said second rockshaft.

4. A windshield wiper system as set forth in claim 1 wherein said fourth pivot means comprises a pin, and wherein said third crankarm is positioned for movement in a plane which is generally perpendicular to the plane formed by said first elongated link and said first and second crankarms, and wherein said pin is located proximate said first pivot means whereby the relative lengths of said first and second elongated links and their relative positioning requires very little movement of the portion of said second link in the vicinity of said pin in a direction which is substantially parallel to the plane which includes said first elongated link and said first and second crankarms.

5. A windshield wiper linkage for driving first and second wiper blades mounted on opposite sides of the center line of a windshield comprising first and second rockshafts adapted to be mounted at opposite sides of the center line of said windshield, first and second crankarms coupled to said first and second rockshafts, respectively, a first elongated link, first pivot means coupling one end of said first elongated link to said first crankarm, second pivot means coupling the other end of said first elongated link to said second crankarm, a second elongated link extending generally in the same direction as said first elongated link, third pivot means having its pivotal center on a line connecting said first and second pivot means for coupling one end of said second elongated link to said first elongated link proximate said first pivot means but spaced away from said first crankarm along the length of said first elongated link, and means on the other end of said second elongated link proximate said second crankarm adapted to be connected to the output of a wiper motor whereby the output of said wiper motor may be transmitted to said first elongated link through said second elongated link with less relative rotation between said first and second elongated links at said third pivot means than exists between said first elongated link and said crankarms at said first and second pivot means.

References Cited in the file of this patent

UNITED STATES PATENTS

| | | |
|---|---|---|
| 1,520,904 | Keim | Dec. 30, 1924 |
| 2,691,186 | Oishei et al. | Oct. 12, 1954 |
| 3,003,172 | Harris | Oct. 10, 1961 |

FOREIGN PATENTS

| | | |
|---|---|---|
| 48,939 | France | June 21, 1938 |
| | (Add to 772,917) | |
| 734,423 | Germany | Apr. 15, 1943 |
| 911,701 | Germany | May 17, 1954 |